** 3,236,711
METHOD AND APPARATUS FOR MAKING
NON-WOVEN FABRIC
Solomon Adler, Kew Gardens, N.Y., assignor to Adler
Process Corp., New York, N.Y., a corporation of New
York
Filed Apr. 3, 1961, Ser. No. 100,267
4 Claims. (Cl. 156—174)

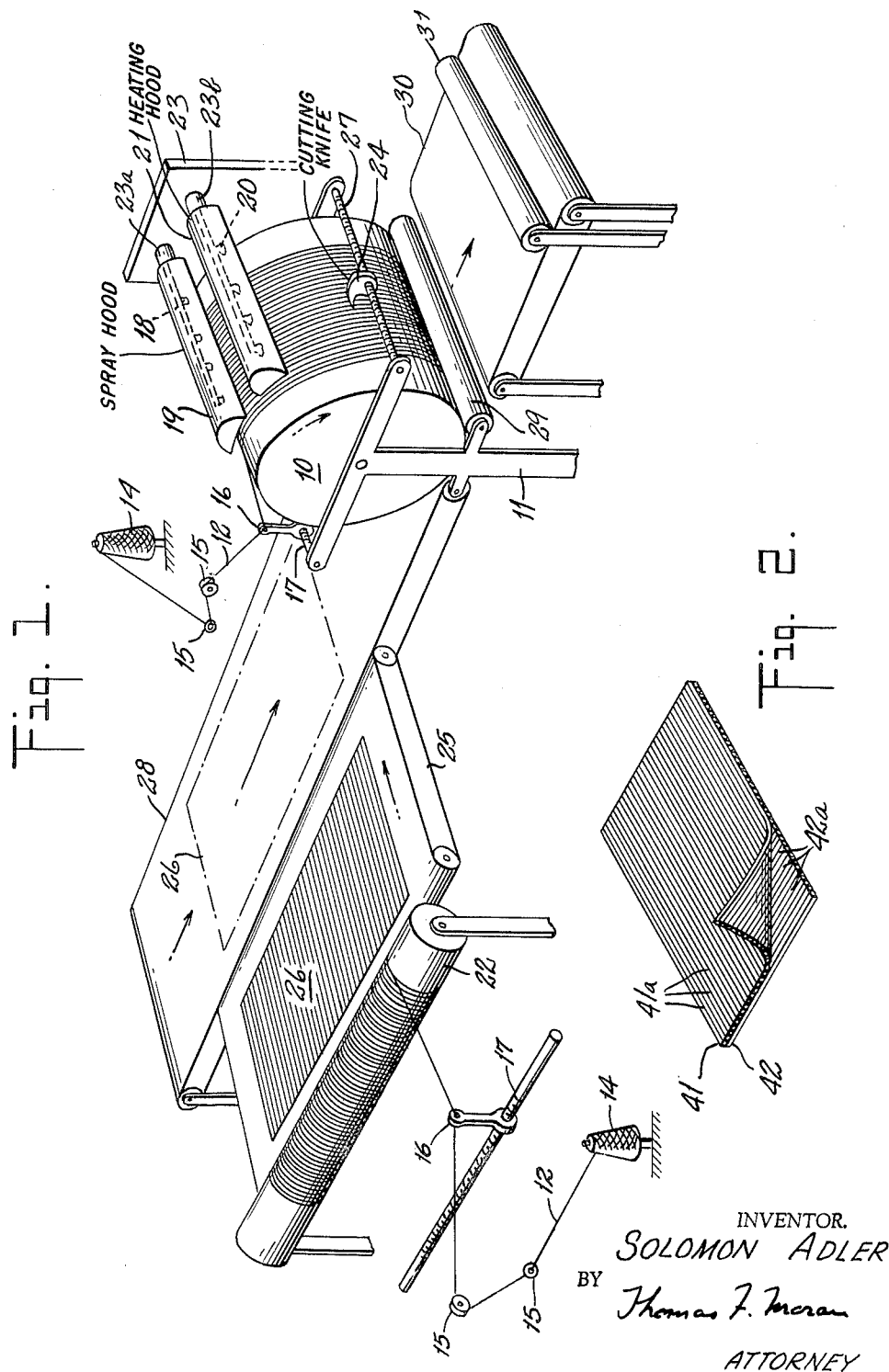

This invention relates to fabrics. More particularly, this invention relates to fabrics having physical characteristics suitable for the manufacture of outerwear garments and the like. Still more particularly, this invention relates to non-woven fabrics and to their method of manufacture and apparatus for manufacturing the same. By non-woven fabric is meant a fabric not characterized by the interweaving or interlacing of yarns, strands or other filamentary material.

Non-woven fabrics manufactured commercially usually comprise a web of short, discontinuous fibers, natural or synthetic, bound together by means of a suitable binding agent. Such non-woven fabrics are "boardy" in appearance and feel and exhibit little abrasion resistance, for the most part are non-washable and, accordingly, are not generally suitable for the manufacture of outerwear garments.

It is an object of this invention to provide an improved fabric, particularly an improved non-woven fabric suitable for use as outerwear.

Another object of this invention is to provide a non-woven fabric having improved physical characteristics such as hand, drape, washability and abrasion resistance and suitable for the manufacture of outerwear garments and the like.

Still another object of this invention is to provide a method and apparatus for the manufacture of a non-woven fabric.

Yet another object of this invention is to provide a simple, economical method for the manufacture of non-woven fabrics.

Still another object of this invention is to provide a method and apparatus for the manufacture of non-woven fabric, the method and apparatus being adaptable for the manufacture of non-woven fabric made up of substantially any type of filamentary material, such as continuous strands or yarns or filaments of natural or synthetic fibers or materials, e.g. cotton, wool, mohair, silk, linen, rayon, acetate, nylon, Dacron or mixtures thereof and the like.

How these and other objects of this invention are accomplished will become apparent in the light of the accompanying disclosure made with reference to the accompanying drawings wherein:

FIG. 1 is a perspective view of apparatus suitable for the manufacture of non-woven fabric in accordance with this invention; and FIG. 2 is a perspective view of a fabric sample prepared in accordance with this invention, the top layer of the fabric being peeled back to better illustrate the construction of the fabric and the arrangement of the fibers therein.

In at least one embodiment of the practice of this invention at least one of the foregoing objects will be achieved.

A fabric prepared in accordance with this invention comprises an assembly of superposed layers of filamentary material, each of said layers comprising a plurality of side-by-side contiguous, unidirectionally oriented, continuous length filamentary material. The filamentary material in at least one pair of adjacent layers of said assembly is disposed in non-parallel relationship, e.g. at an angle of 90°, with respect to each other. Also, the filamentary material in each of said layers is bound together and the adjacent layers are bound to each other by suitable means. Further, the outside surfaces of the outside layers of the fabric assembly are substantially free of any extraneous binding agent.

More particularly, a fabric prepared in accordance with this invention comprises an assembly of superposed layers, each of said layers comprising a plurality of side-by-side contiguous, unidirectionally oriented, continuous length filamentary material, the thickness of each of said layers being substantially the same as the thickness of the filamentary material making up the layer, the filamentary material in at least one pair of adjacent layers of said assembly being disposed in non-parallel relationship with respect to each other and a binding agent provided between adjacent layers binding together the filamentary material in each of said layers to form said layers and binding said adjacent layers to each other, the outside surface of the outside layers of said assembly being substantially free of said binding agent.

The fabric structure prepared in accordance with this invention may comprise two or more superposed layers of a continuous length filamentary material depending upon the thickness desired in the resulting fabric structure. Satisfactory fabrics have been prepared employing only two layers of filamentary material, the filamentary material in one layer being disposed in a non-parallel (at an angle in the range of 30°–90°) crossing relationship with the filamentary material in the other layer. In the instance where more than two layers, such as three to six or more layers, comprise the fabric assembly in accordance with this invention, although it is preferred that the filamentary material in all adjacent layers be disposed in non-parallel relationship, such as about 90° apart, the filamentary material in one or more pairs of adjacent layers may be disposed in substantially parallel, non-crossing relationship provided the filamentary material in at least one pair of adjacent layers is disposed in non-parallel, crossing relationship.

The subject fabrics are characterized in that the filamentary material making up the superposed separate layers thereof is susbtantially continuous length filamentary material. Specifically, in the practice of this invention, the filamentary material making up the separate layers of the fabric is continuous length filamentary material extending completely along the fabric in the direction in which the filamentary material is oriented and disposed in its respective layer. Accordingly, no weak spots within the fabric structure, i.e. in one or more of the layers making up the fabric, are present due to discontinuities in the filamentary material making up the fabric structure. It is particularly preferred in the practice of this invention that the filamentary material making up a given layer of the fabric structure be derived from a single, continuous length of filamentary material.

The filamentary material making up the layers of the fabric may be any suitable material, such as strands or yarns or filaments, mono-filaments or a strand comprising a plurality of mono-filaments of natural or synthetic material, organic or inorganic, or mixtures thereof. Suitable filamentary material may be made of cotton, silk, wool, linen, mohair, animal fibers and the like as well as the synthetic fibers made of rayon, acetate, nylon, Dacron, Dynel, glass, rock wool, etc. Particularly suitable in the manufacture of a fabric in accordance with this invention are cotton and other textile materials suitable and desirable for use in outer-wear garments and the like. In general, substantially any filamentary material may be employed in the manufacture of a fabric in accordance with this invention.

The filamentary material making up the layers comprising the fabric is usually bound in the layer and the adjacent layers bound together by means of a suitable binding agent. Substantially any binding agent may be employed in the practice of this invention depending upon the characteristics desired in the finished fabric and/or the chemical and physical properties of the filamentary material making up the fabric and to which the binding agent is applied. The binding agent should be compatible with the filamentary material making up the fabric structure and effective for its desired purpose, i.e. to bind together the filamentary material to which it is applied and the layers of filamentary material. Usually, the binding agent is applied to one or more layers of the filamentary material making up the fabric and the thus-treated layers assembled or superposed so that the coated surfaces of the layers are in contact with each other. In such an arrangement the binding material is disposed between adjacent layers of filamentary material in the fabric structure and may even be separately identifiable therein as a separate layer.

When the filamentary material employed in the manufacture of a fabric in accordance with this invention possesses or exhibits properties of thermoplasticity or is thermoplastic or, even, thermosetting, the use of a separate or extraneous binding agent may be avoided. By suitable technique thermoplastic or thermosetting filamentary material making up one or more layers of the fabric structure can be treated, e.g. by an application of heat and pressure, to bind itself together to form a coherent layer and, also, to bind itself with filamentary material making up an adjacent layer.

Various methods may be employed to bind together the filamentary material making up a layer of the fabric structure and/or to bind adjacent layers of filamentary material together. One such method involves coating or applying to the filamentary material making up one or more layers with a material which is activated by contact with a solvent or other activating agent to bind together the thus-coated filamentary material and adjacent layers of filamentary material in contact therewith.

Another method of binding together layers of filamentary material, the so-called "dry binder" system, involves the use of finely-divided thermoplastic material, such as short length thermoplastic fibers or finely-divided thermoplastic powder. In accordance with this system one layer of filamentary material is bound to another layer of filamentary material and advantageously the filamentary material in a given layer of filamentary material is bound together. In the so-called dry binder system a layer of filamentary material prepared in accordance with this invention is treated or coated with a light spray of resin, such as acrylate or methacrylate or ethyl acrylate, butyl methacrylate, isobutyl methacrylate, ethyl methylacrylate and the like. Finely-divided thermoplastic material is then distributed on the resin coated surface so as to coat a substantial area thereof. The thus-coated sheets or layers of filamentary material are then assembled together such that the coated surfaces come in contact and the resulting assembly passed between heated rolls at an elevated temperature, such as about 340° F. and at an elevated pressure, e.g. in the range 30–40 p.s.i., sufficient to soften and render fluid the thermoplastic material and to effect a sealing or binding of the two thus treated layers.

Another method of applying a binding agent to the filamentary material and the layers thereof to be bonded together, the so-called "wet binder" system, involves the application of polymer lattices to the filament material, preferably aqueous polymer lattices are employed. In this technique a latex emulsion, such as an emulsion of butadiene acrylonitrile, butadiene styrene, acrylate, polyvinyl chloride, polyvinyl acetate, polychloroprene and carboxy-modified lattices of butadiene-styrene and butadiene-acrylonitrile, epoxy resins, isocyanate resins (polyurethane), melamine resins, melamine formaldehyde phenolic resins, phenolic-epoxy resins, polyamide resins, polyamide-epoxy resins, polyester resins, casein, resorcinol resin, is applied to two sheets or layers of filamentary material undergoing treatment. The thus-treated surfaces of the sheets are placed together and passed through heated rolls or otherwise subjected to an elevated temperature and pressure, e.g. a temperature in the range 200–350° F. and a pressure in the range 20–40 pounds per square inch to effect activation of the polymer lattices and binding together of the thus-coated sheets of filamentary material.

In the instance where the binding agents tend to be or are film-forming and when it is desired that the resulting fabric exhibit breathability it is desirable to include a blowing agent in the binding agent or otherwise incorporated on the treated surfaces of the layers of filamentary material to be bound so as to form between the sheets of filamentary material a cellular, porous binding structure of binding agent. Usually, an amount of blowing agent in the range 0.5–10% by weight of the binding agent yields satisfactory results. For example, diazoaminobenzene may be employed as a blowing agent in admixture with polyvinyl chloride as the binding agent or diisocyanate may be employed as the blowing agent with a casein resorcinol binding agent. Other blowing agents which are useful to improve the breathability of fabrics prepared in accordance with the practice of this invention and containing binding agents which tend to be film-forming or otherwise reduce the breathability of the resulting fabric include an admixture of sodium bicarbonate and oleic acid, ammonium carbonates and mixtures of ammonium chloride and sodium nitrite. When the blowing agent is employed in admixture with the binding agent to improve the breathability of the fabric, it is desirable that care should be taken so that the decomposition of the blowing agent during the gas release or gas forming stage does not disrupt the orientation of the filamentary material within the layers undergoing treatment so as to cause the filamentary material to separate from each other and/or to cause the binding agent to be displaced from between the layers to the outside surface of the fabric. Accordingly, it is preferred when a blowing agent is employed or otherwise incorporated in the fabric structure to improve the breathability thereof to first decompose or activate the blowing agent at a reduced temperature and then to pass the sheets or layers of filamentary material through heated rolls at a rather elevated temperature to activate the binding agent therebetween and subsequently to rapidly cool the resulting treated fabric or assembly of layers.

Reference is now made to the drawings, particularly to FIG. 1 thereof which illustrates the method and apparatus in accordance with this invention for the preparation of non-woven fabrics. As illustrated therein, cylinder 10 driven by suitable means, not shown, is rotated on frame or stanchion 11. During rotation of cylinder 10 a continuous length of filamentary material or yarn 12 is supplied from a suitable source, such as yarn cone 14, over tension discs 15 and through guide 16 onto the surface of drum 10. Guide 16 is supported on threaded rod 17 and is adapted to move along the length of drum 10 as drum 10 is rotated. During rotation of drum 10 filamentary material 12 is wound on the surface thereof in parallel, contiguous side-by-side relationship. An amount of filamentary material 12 is wound on the surface of drum 10 sufficient to completely cover the outside of drum 10. In the practice of this invention illustrated in FIG. 1, a single layer of filamentary material 12 is deposited on drum 10.

When the surface of drum 10 is completely covered with a layer of filamentary material 12, a spray of binding agent, such as polyvinyl chloride, latex, e.g. Geon Latex 576 manufactured by B. F. Goodrich Chemical Company, is applied to the filamentary material on drum 10 via nozzles 18 which are shown in dashed outline beneath hood 19. Simultaneously with the application of the binding agent (polyvinyl chloride) to the filamentary material on drum 10 heat is applied to the resulting coated filamentary material by means of heating lamps 20 shown in dashed outline beneath hood 21. The application of heat to the binder coated filamentary material on the surface of drum 10 serves to convert the filamentary material on drum 10 into a coherent, substantially self-supporting layer or sheet. Spray heads 18 and hood 19 and heating lamps 20 and hood 21 are supported by rods 23a and 23b, respectively, which are fixed to wall post 23.

Substantially at the same time that a layer of filamentary material is being wound on drum 10 another layer of filamentary material, either the same filamentary material or a different type of filamentary material, is deposited and formed by the same manner on the surface of drum 22. Drum 22 is provided, like drum 10, with associated filamentary material supply means and guide means as well as means for applying binding agent and for drying or heating or actuating the binding agent. For reasons of clarity and ease of understanding these associated pieces of equipment are merely schematically illustrated in FIG. 1 but with the same reference numerals for respective or equivalent elements and their use in association with respect to drum 22 will be readily apparent to those skilled in the art in the light of this disclosure and drawing.

As illustrated in FIG. 1, drum 10 (and also drum 22 although not illustrated therein with respect to drum 22 for reasons of clarity and ease of understanding of the drawing) has associated therewith cutting means or cutting blade 24 mounted on bar 27 and adapted to traverse the length of drum 10 to cut the filamentary material deposited thereon so as to effect its removal from the drum.

After drum 22 has been wound with filamentary material and the filamentary material thereon bonded together to form a substantially coherent sheet or layer, the wound filamentary material is cut along the length of drum 22 and removed from drum 22 and placed on belt conveyor 25. The thus-removed sheet of filamentary material is indicated by reference numeral 26. The lines on sheet or layer 26 are indicative of the direction and orientation of the filamentary material making up the same.

It is pointed out that the length of cylinder 22 is proportioned and adjusted with respect to drum 10 such that the length of drum 22 and the layer 26 of filamentary material are substantially equal to the circumference of drum 10 and the width of layer 26 or circumference of drum 22 is substantially equal to the length of drum 10 or the width of the filamentary material deposited thereon.

As indicated in FIG. 1, layer 26 is transferred via belt conveyor 25 to a second belt conveyor 28 associated with drum 10. Belt conveyor 25 is disposed transversely with respect to belt conveyor 28. Upon delivery of layer 26 to belt conveyor 28, layer 26 having been deposited on belt conveyor 25 such that the resin coated or binding agent coated surface of layer 26 is exposed on top, it is transferred by belt conveyor 28 to contact drum 10.

Drum 10 has wound thereon filamentary material 12 so that when layer 26 contacts drum 10 the resin coated surfaces of layer 26 and the filamentary material 12 wound on drum 10 come into direct contact with each other. Drum 10 is then rotated in a suitable direction to carry layer 26 forward and beneath drum 10 to cause the opposed resin coated surfaces to adhere together. As drum 10 is so rotated, heating or calender roll 29 is pressed into contact with the uncoated exposed surface of layer 26 being carried on and taken up by drum 10. As drum 10 continues to rotate so as to bring additional layer 26 into contact with the filamentary material wound on drum 10 the heated pressure roll 29 heats the thus-assembled layers of filamentary material to activate the binding agent, polyvinyl chloride resin, therebetween so as to effect a sealing and binding together so as to effect a sealing and binding together of the filamentary material in layer 26 and the filamentary material wound on drum 10. After drum 10 has made a complete revolution in contact with layer 26, drum 10 now has deposited thereon two layers of filamentary material, the filamentary material 12 originally deposited directly thereon and the filamentary material in layer 26 originally wound on drum 22.

It is pointed out that when layer 26 is brought into contact with the filamentary material already wound on drum 10 the filamentary material of layer 26 is disposed in direct contact with and runs in a non-parallel direction, at an angle of 90°, with respect to the filamentary material of the adjacent layer formed on drum 10. After the binding agent has been activated by pressing hot calender roll 29 against drum 10 to press together the assembled filamentary material on drum 10 the resulting assembled bound layers are stripped from drum 10 by moving cutting blade 24 across the length of drum 10 to cut the assembled bound filamentary material. Thereafter, the assembled layers of filamentary material are removed from drum 10 by suitable means and deposited on conveyor 30 for delivery to wind up roll 31.

Although in the embodiment of this invention as illustrated in FIG. 1 the fabric comprises an assembly of two layers of filamentary material, it is evident that more than two layers of filamentary material may be assembled in accordance with this embodiment of the practice of this invention. In the assembly of layers of filamentary material the binding agent, where employed, to bind adjacent layers is applied such that substantially none of the binding material is on the outside surface of the outside layers of the resulting assembly. Also, in the assembly of the layers of filamentary material coated with a binding agent, the coated surfaces of the binding agent are placed together in contact with each other.

Further, in the embodiment of the practice of this invention illustrated in FIG. 1 rotating drum 10 and rotating drum 22 are each employed to prepare a layer of side-by-side, contiguous, unidirectionally oriented filamentary material. Solid forms other than a cylinder, such as any solid body of revolution, e.g. spheres, ellipsoids, may be employed in the practice of this invention, even angular solid bodies, such as cubes and the like.

The fabric of this invention is particularly useful for wearing apparel. Many parts of wearing apparel, such as skirts, trouser legs, sleeves and body sections can be produced directly by following the practices of this invention and without the need of cutting, assembling and sewing. For example, conventional garments, such as ordinary outerwear garments, are an assembly of tubular elements, such as skirts, body sections, trousers, sleeves, etc. To produce a skirt, sleeve or trouser section in accordance with this invention it is only required that the filamentary material be wound and assembled on a cylindrical form having the shape and dimensions desired in the garment. A continuous length of filamentary material or yarn is assembled or wound on the cylinder in the manner described hereinabove and instead of removing the assembled layers of filamentary material by cutting and stripping, the assembled layers are removed by drawing or sliding off the cylinder. As a result there is produced a garment portion or section in the desired form and without any cutting, assembling or sewing.

Similarly, an article of intimate apparel, such as a brassiere, can readily be produced by employing the practices of this invention. In this embodiment a form having the shape substantially that of the desired article is used and upon this form a layer of filamentary material is assembled in the manner described hereinabove. The resulting assembled filamentary material is removed from the form by cutting the side opposite the contour, bust forming side. A second layer of filamentary material is then assembled in substantially the same manner and the first assembled layer, i.e. the contour or cup portion thereof, placed upon the second assembled layer in a crosswise manner so that the filamentary material making up one of the assemblies, particularly the contour portion, is oriented in a non-parallel direction, e.g. 90° apart, with respect to the filamentary material making up the contour portion of the other assembly. The resulting arranged layers are then bound together by means of a binding agent in the manner described hereinabove. The resulting bound layers are removed from the form by cutting the side opposite the contour bust forming side and the fabric trimmed to the desired shape. Fastening means are then attached to complete the article.

A garment so prepared can be made to conform to the actual shape and contour of the body. Since the resulting garment is substantially seamless, an attractive garment is produced. Further, if desired, additional materials, such as stays, padding and the like, can be readily built into the article during its forming operation by inserting the same between adjacent layers of the filamentary material.

Referring now to FIG. 2 of the drawing, there is illustrated therein in schematic form a two layer fabric prepared in accordance with this invention, the top layer of the fabric is partially peeled back to better illustrate the construction of the fabric. Top layer 41 comprises a plurality of continuous length filamentary material, such as cotton yarn or thread 41a and the bottom layer 42 also comprises continuous length filamentary material, such as cotton thread or yarn 42a. Filamentary material 42a is disposed and in contact with filamentary material 41a such that filamentary material 42a runs transversely or perpendicular, 90°, with respect to filamentary material 41a. If desired, substantially any non-parallel crossing relationship may suitably exist between filamentary material 41a and 42a. For example, filamentary material 41a and 42a may intersect each other at an angle of about 45°, such that the resulting fabric can be said to have been cut on a bias. Generally, the filamentary material of adjacent layers of a fabric prepared in accordance with this invention are arranged and disposed with respect to each other so as to intersect at an angle in the range 30–90°.

Substantially any number of filaments or threads or yarns or strands per linear inch, measured in a direction transverse to the length of the filamentary material, may be employed in the preparation of a layer of filamentary material in accordance with this invention. For example, depending upon the size or thickness or diameter of the filamentary material there may be present a number of filaments in the range 10–1000, more or less, per linear inch. Similarly, the thickness of each layer of filamentary material will depend upon the thickness or diameter of the filamentary material employed therein. For example, the thickness of a layer of filamentary material assembled in accordance with the practices of this invention may be in the range 0.001–0.1", more or less.

Various types of filamentary material or yarn or strand or thread may be employed. The filamentary material may be looped, spun, curled, crimped, lofted, etc. These textured filamentary materials may be made of substantially any material, natural or synthetic.

The following examples are illustrative of the practices of this invention:

EXAMPLE NO. 1

A fabric was made in accordance with the practices of this invention as described in connection with FIG. 1 of the drawing by winding and assembling continuous length filamentary material on a drum. The fabric, having the structure illustrated in FIG. 2 of the drawing was manufactured from continuous length black wool yarn having a thickness of 0.015". The assembled fabric was made of two sheets or layers of the yarn, the filament material in the separate layers being disposed 90° apart. The assembled fabric had a thickness of 0.040" and a binding agent, polyvinyl chloride, comprised 25% of the fabric thickness. Wool fibers are naturally weak and fabrics woven from wool yarn exhibit the same weakness. Nevertheless, this, this fabric exhibited exceptional tensile strength and unusual tear and burst resistance.

EXAMPLE NO. 2

A fabric, like the fabric of Example 1, was prepared in accordance with the practices of this invention. This fabric was made of continuous length, inexpensive, mercerized red and gray cotton three cord twist yarn 0.006" thick. The assembled two layer fabric was 0.021" thick and the binding agent, polyvinyl chloride, therebetween represented about 42% of the overall thickness of the fabric. The fabric exhibited exceptional tensile strength and unusual tear and burst resistance. The fabric also had excellent hand, drape, washability, dry cleanability, wear and stretch properties. The breathability of the fabric was fair, due primarily to the texture and density of the yarn used and the ratio of the binder to thread content in the fabric. The weight, thickness and density of the fabric made is useful for suiting and skirting material. The fabric resembled in appearance an expensive closely woven fabric and possessed a pleasing pattern. One side of the fabric had red and gray colored rows of equal width and the other side showed a solid red color. This fabric also had the desirable feature of reversibility.

By using different colored yarns or combinations of colored and specially prepared or textured yarns infinite variety of patterns and texture fabrics can be produced by following the practices of this invention. Fabrics can be prepared for dyeing, printing and finishing treatment for water repellency, shrinkage control, flame resistance and the like. If desired, however, these features or properties may already be incorporated in the filamentary material prior to the manufacture of the fabric therefrom.

EXAMPLE NO. 3

Following are tabulations of the construction and properties of a number of fabrics prepared in accordance with the practices of this invention. Each fabric comprises two layers of unidirectionally oriented filamentary material, the filamentary material in the layers being disposed at an angle of 90° with respect to each other. In each instance the fabric was prepared in accordance with the method illustrated and described in connection with FIG. 1 of the drawing, the binding agent employed being polyvinyl chloride plastic latex known as Geon Latex 576. The binding agent was applied as a light spray on the surface of the assembled layers of filamentary material and the resulting coated surfaces of assembled layers brought together and heated under pressure at a temperature in the range 280–300° F. for a period of time of about 20 seconds.

Table No. I

FABRIC CONSTRUCTION

| Sample No. | Yarn Type | Thickness, inches | Fabric Thickness, inches | Binder Thickness, inches |
|---|---|---|---|---|
| 1 | Nylon fiber, unspun tow. | .003–.005 | .030 | .010 |
| 2 | Cotton, spun, 2 cord | .004–.005 | .015 | .011 |
| 3 | do | .006–.007 | .020 | .006 |
| 4 | Rayon, spun, "Shiffli," 2 cord. | .006 | .019 | .006 |
| 5 | Cotton, mercerized, spun, 2 cord. | .009–.010 | .030 | .010 |
| 6 | Nylon, spun, 2 cord | .010–.012 | .030 | .010 |
| 7 | Dacron, "stitch lock," spun, 2 cord. | .007–.008 | .019 | .006 |
| 8 | Wool (knitting), 3 cord. | .015 | .040 | .010 |
| 9 | do | .015 | .062 | .015 |
| 10 | Cotton, spun, 2 cord | .006–.007 | .030 | .015 |
| 11 | Wool (knitting), 3 cord. | .015 | .060–.072 | .020 |
| 12 | Cotton, spun, 2 cord | .006–.007 | .021 | .007 |
| 13 | Velvet, knitting yarn | .029–.030 | .065 | .020 |

Table No. II

FABRIC PROPERTIES

| Sample No. | Breathability | Hand | Tensile Strength | Burst Strength | Abrasion Resistance | Washability |
|---|---|---|---|---|---|---|
| 1 | Fair | Good | Excellent | Excellent | Good | Good. |
| 2 | Good | Excellent | do | do | do | Do. |
| 3 | do | do | do | do | do | Do. |
| 4 | do | do | do | do | do | Do. |
| 5 | do | do | do | do | do | Do. |
| 6 | do | do | do | do | do | Do. |
| 7 | do | do | do | do | do | Do. |
| 8 | Excellent | do | Stronger than woven. | Good | do | Do. |
| 9 | do | do | Good | do | do | Do. |
| 10 | Fair | do | do | do | do | Do. |
| 11 | Excellent | do | Stronger than woven. | do | do | Do. |
| 12 | Good | do | Excellent | do | do | Do. |
| 13 | Excellent | do | do | do | do | Do. |

As will be apparent to those skilled in the art in the light of the foregoing disclosure many modifications, alterations and substitutions are possible in the practice of this invention without departing from the spirit or scope thereof.

I claim:

1. A method of preparing a fabric which comprises laying down by winding on the surface of a drum a continuous length of filamentary material, said filamentary material being deposited on said drum in contiguous side-by-side relationship, applying a binding agent to the outside surface of said filamentary material on said drum, removing the thus-deposited filamentary material from said drum by cutting the thus-laid down filamentary material in a direction parallel to the axis of said drum so as to yield a sheet of said filamentary material, said sheet having a thickness substantially the same as the thickness of said filamentary material, repeating the aforesaid first-mentioned operation to lay down by winding on the surface of a drum a continuous length of filamentary material in contiguous side-by-side relationship to form thereon a layer of filamentary material of mono-filament thickness and applying a binding agent to the exposed surface thereof while on said drum and bringing said sheet of filamentary material into contact with said layer of filamentary material on said drum such that the filamentary material in said sheet runs in a non-parallel direction with respect to the filamentary material of said layer on said drum and such that the binding agent coated surfaces of the layer of filamentary material on said drum and of said sheet are brought into direct contact with each other and binding together the coated surfaces of said layer of filamentary material and said sheet by means of said binding agent.

2. A method of preparing a fabric having improved physical properties and suitable for use in the manufacture of an outerwear garment which comprises laying down by winding on the surface of a drum in contiguous side-by-side relationship a continuous length of filament material in an amount to cover a substantial portion of the surface of said drum, applying a binding agent to the outside surface of the thus-deposited filament material on said drum, applying to the thus-coated outside surface of the deposited filament material on said drum a layer of similarly prepared filament material, the applied layer of filament material being placed in contact with the aforesaid first-mentioned deposited filament material, such that the coated surfaces of the respective filament material are in direct contact and such that the filament material in the layers is in non-parallel relationship, binding together the thus-applied layers of filament material by means of said binding agent and removing from the drum the resulting formed fabric comprising two layers by cutting the fabric in a direction parallel to the axis of said drum, the outside surfaces of the resulting formed fabric being substantially free of said binding agent.

3. A method in accordance with claim 2 wherein said binding agent comprises a thermoplastic material and wherein the applied layer of filament material is placed in contact with the aforesaid first-mentioned deposited filament material under conditions of temperature and pressure to activate the thermoplastic material and said binding agent to bind said layers together.

4. Apparatus comprising a first drum mounted for rotation and a second drum mounted for rotation, the axis of rotation of said second drum being disposed 90° with respect to the axis of said first drum, first conveying means associated with said first drum and second conveying means associated with said second drum, said second conveying means being disposed and arranged for conveying flat material from said second drum to said first conveying means, said first and second conveying means being disposed with respect to each other such that the material to be conveyed by said second conveying means moves at about a 90° angle with respect to direction of motion of the material to be conveyed by said first conveying means, said first drum and said second drum being disposed and proportioned such that the axial length of said second drum is substantially equal to the circumference of said first drum and the circumference of said second drum is substantially equal to the axial length of said first drum, separate means associated with said first drum and said second drum for winding filament material thereon in substantially side-by-side contiguous relationship, separate cutting means associated with said first drum and said second drum for cutting wound filamentary material from each of said drums by cutting the wound filament material in a direction parallel to the axis of the drum, separate means associated with said first drum and said second drum for applying a binding agent to the wound filament material thereon, heating means associated with said first drum for activating the binding agent applied to the filament material wound on said first drum and pressing means associated with said first drum for pressing material applied thereon.

References Cited by the Examiner
UNITED STATES PATENTS

| | | | |
|---|---|---|---|
| 1,660,924 | 2/1928 | Hopkinson | 154—92 |
| 2,107,067 | 2/1938 | Alderfer | 154—90 |
| 2,131,024 | 9/1938 | Cordts | 154—92 |
| 2,609,320 | 9/1952 | Modigliani | 156—174 |
| 2,781,287 | 2/1957 | Gustus et al. | 154—90 XR |
| 2,862,541 | 12/1958 | Brink | 154—90 XR |
| 2,919,217 | 12/1959 | Bobkowicz | 156—46 |

EARL M. BERGERT, *Primary Examiner.*